(12) United States Patent
Kadish

(10) Patent No.: US 10,328,672 B2
(45) Date of Patent: Jun. 25, 2019

(54) METHOD FOR APPLYING METALS TO CLAY WITH COLORED SLIP AND UNCOLORED CLAY

(71) Applicant: Susan Kadish, Old Westbury, NY (US)

(72) Inventor: Susan Kadish, Old Westbury, NY (US)

(*) Notice: Subject to any disclaimer, the term of this patent is extended or adjusted under 35 U.S.C. 154(b) by 23 days.

(21) Appl. No.: 15/619,901

(22) Filed: Jun. 12, 2017

(65) Prior Publication Data

US 2017/0355174 A1     Dec. 14, 2017

Related U.S. Application Data

(60) Provisional application No. 62/349,231, filed on Jun. 13, 2016.

(51) Int. Cl.

| | |
|---|---|
| *C23C 30/00* | (2006.01) |
| *B32B 13/06* | (2006.01) |
| *C04B 33/04* | (2006.01) |
| *C04B 41/90* | (2006.01) |
| *C04B 33/34* | (2006.01) |
| *C04B 41/00* | (2006.01) |
| *C04B 41/52* | (2006.01) |

(52) U.S. Cl.
CPC .............. *B32B 13/06* (2013.01); *C04B 33/04* (2013.01); *C04B 33/34* (2013.01); *C04B 41/009* (2013.01); *C04B 41/52* (2013.01); *C04B 41/90* (2013.01); *B32B 2264/105* (2013.01)

(58) Field of Classification Search
CPC ......... B32B 13/06; C23C 30/00; C04B 33/04; C04B 33/32
See application file for complete search history.

(56) References Cited

U.S. PATENT DOCUMENTS

| | | | | |
|---|---|---|---|---|
| 2,131,187 A | * | 9/1938 | Liebmann | H01J 29/43 204/192.15 |
| 3,060,610 A | * | 10/1962 | Stangl | C03C 17/10 156/89.24 |
| 4,447,473 A | * | 5/1984 | Mashida | B44C 1/005 148/277 |
| 5,229,050 A | * | 7/1993 | Herron | C04B 41/009 264/245 |
| 5,281,635 A | * | 1/1994 | Bishop | C03C 17/06 427/229 |

OTHER PUBLICATIONS https://www.dogwoodceramics.com/product/duncan/duncan-overglazes.htm pp. 7 (Year: 2018).*
https://silver-clay.com/silver-pmc3-syringe-9-grams-slip.html website; pp. 3 (Year: 2018).*
http://www.artclay.co.jp/htm/products/ dated as publicly available on May 7, 2015 by the Internet Archive Wayback machine, pp. 1-7 (Year: 2015).*
Kusek "PMC and the versatile Bisque Bead" © 2010 Aftosa, Partik' Studio, p. 1-8 retrieved from http://lib.store.yahoo.net/ lib/yhst-13391808682274/metalclaybisquebeads.pdf; (Year: 2010).*

* cited by examiner

*Primary Examiner* — Nathan H Empie
(74) *Attorney, Agent, or Firm* — Katten Muchin Rosenman LLP

(57) ABSTRACT

Disclosed herein is a method for applying metals to clay. More particularly, the present invention relates to applying malleable metals, such as silver, to clay, such that the metal attaches to the clay and as an added feature forms beads on the surface of the clay.

2 Claims, 7 Drawing Sheets

METHOD FOR APPLYING METALS TO CLAY WITH COLORED SLIP AND UNCOLORED CLAY

FIELD OF THE INVENTION

The present invention relates to a method for applying metals to clay. More particularly, the present invention relates to applying malleable metals, such as silver (a.k.a PMC3) to clay, such that the metal attaches to the clay and as an added feature forms beads on the surface of the clay.

BACKGROUND OF THE INVENTION

Previous attempts to add metal direction, such as silver, to clay has either required that the metal be fastened to the metal or applied during baking. However, malleable metal that is applied during baking in a kiln has led to later slippage of the metal, thus altering the artists intended design. Accordingly, it is an object of the present invention to present a method for applying malleable metal to clay which does not suffer from later slippage.

DETAILED DESCRIPTION

Figure 1:
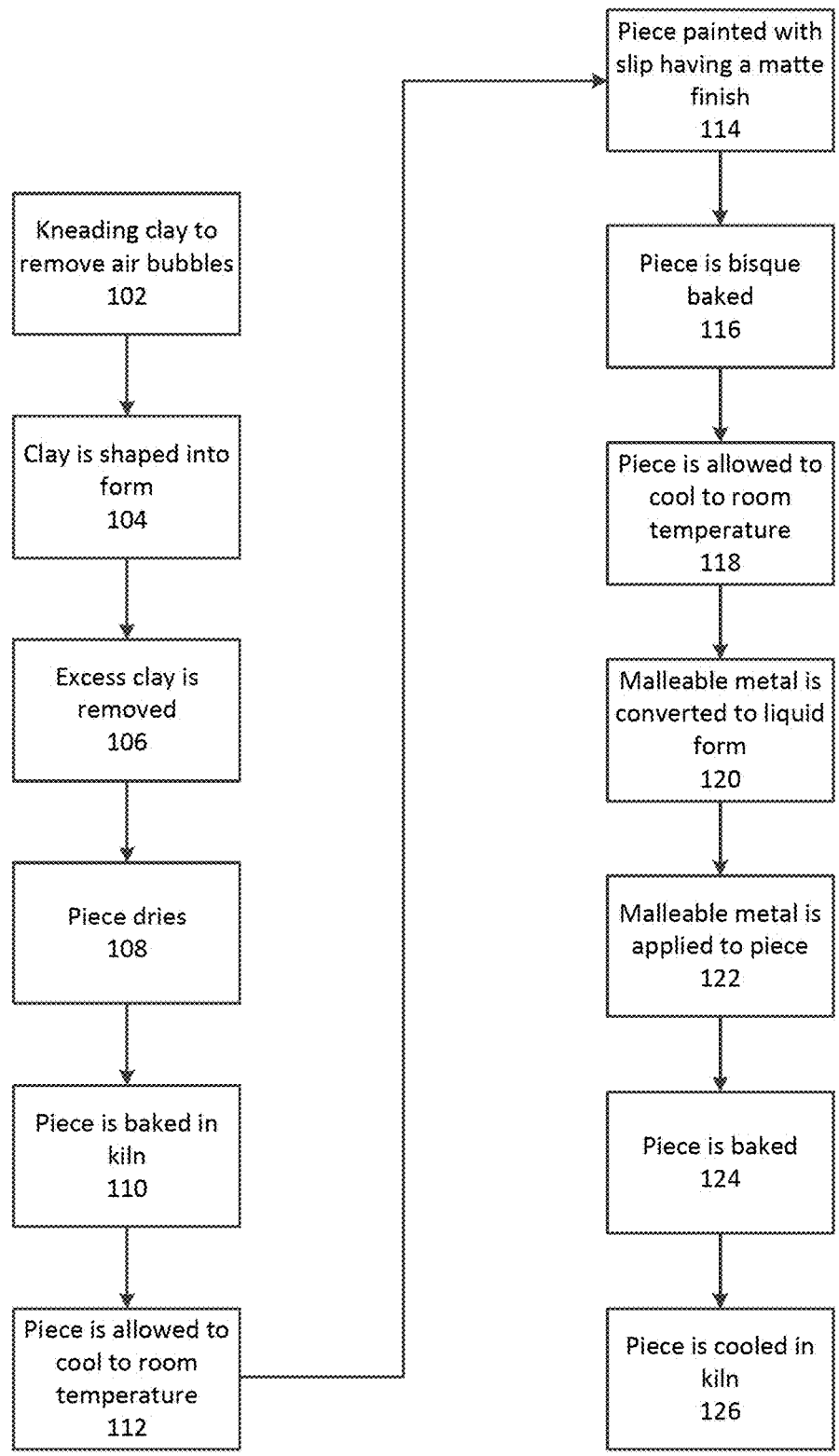
FIG. 1 is a flowchart depicting the method used for applying the malleable metal to clay.
Figure 2:
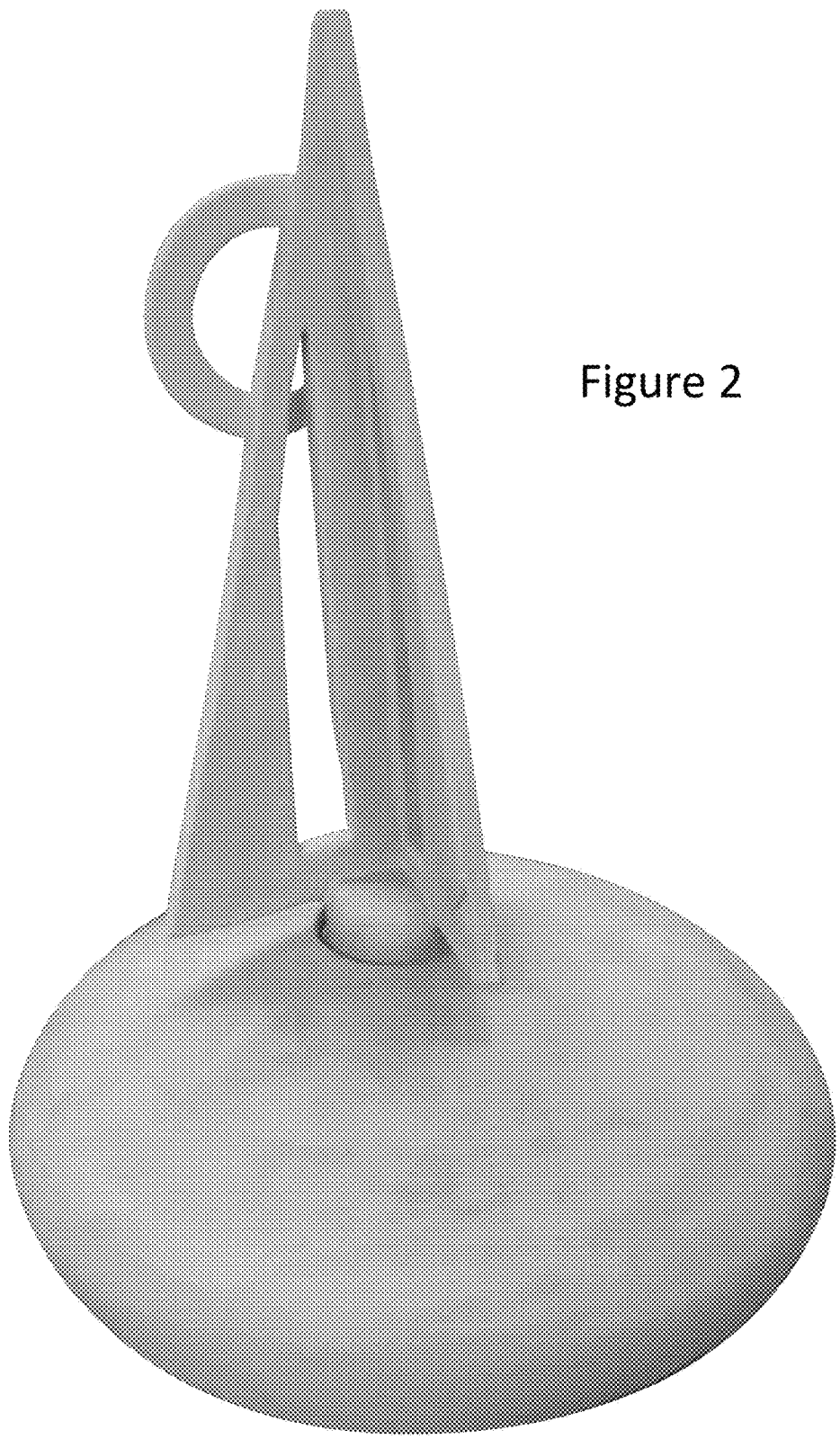
FIG. 2 is a picture of a shaped piece of clay before baking.

The method of the present invention begins with kneading wet clay to remove air bubbles in step 102. Next, the kneaded clay is "thrown" on a potter's wheel and shaped into its desired form in step 104. An example of a shaped piece of clay is depicted in FIG. 2, for example. Any excess clay can then be removed in step 106 and the piece is allowed to dry until it is "leather hard" in step 108. Drying can take anywhere from 24-96 hours depending upon humidity conditions.

Figure 3:
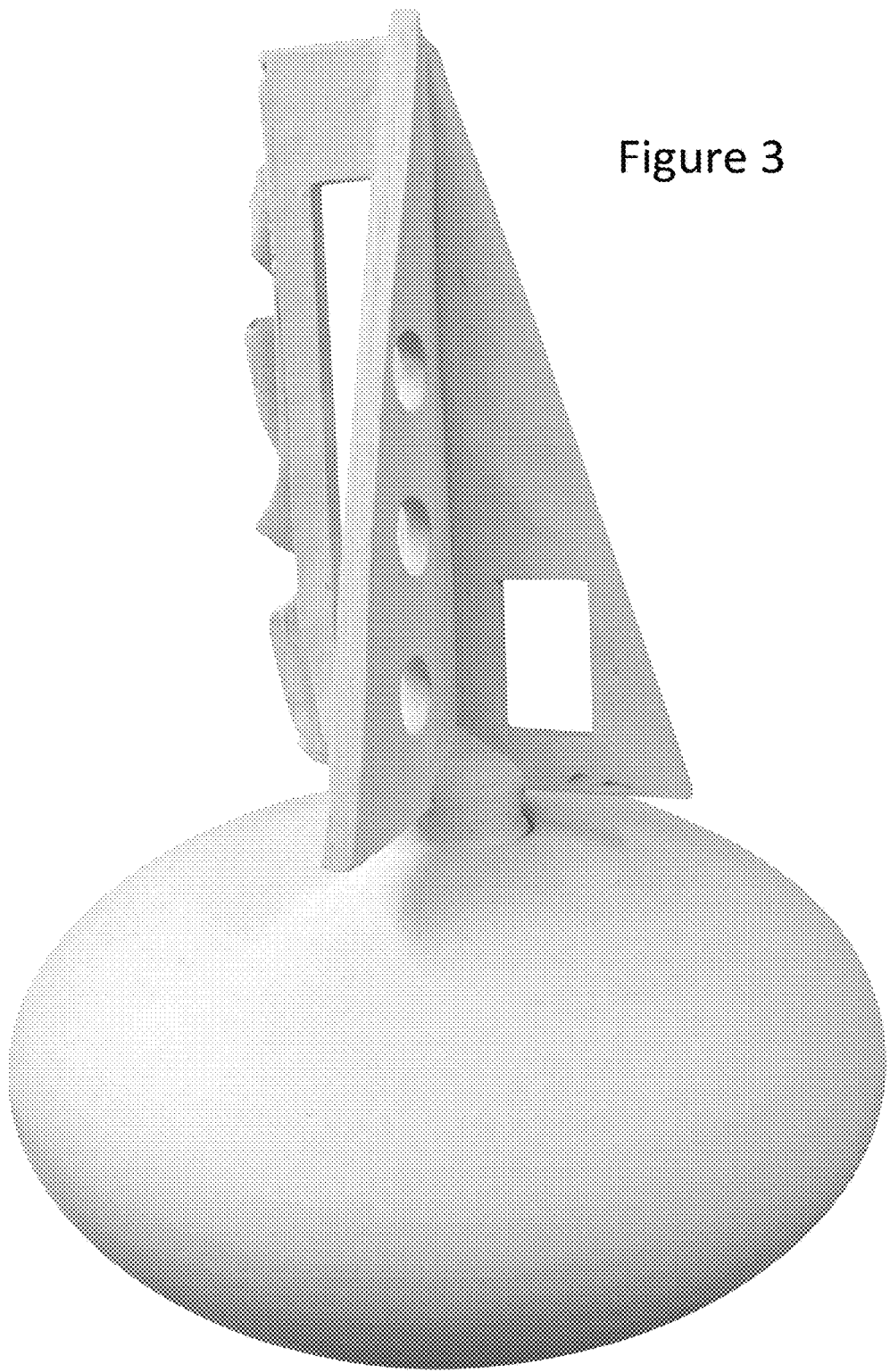
FIG. 3 is a picture of the shaped piece of clay of FIG. 1 after baking.

The piece is then bisque baked in a kiln in step 110. Preferably, the piece is bisque baked at 1560°-2100° F. More preferably, the piece is bisque baked at Cone 06 (1830° F.). After baking, the piece is allowed to cool to room temperature in step 112 as depicted in FIG. 3.

Figure 4:
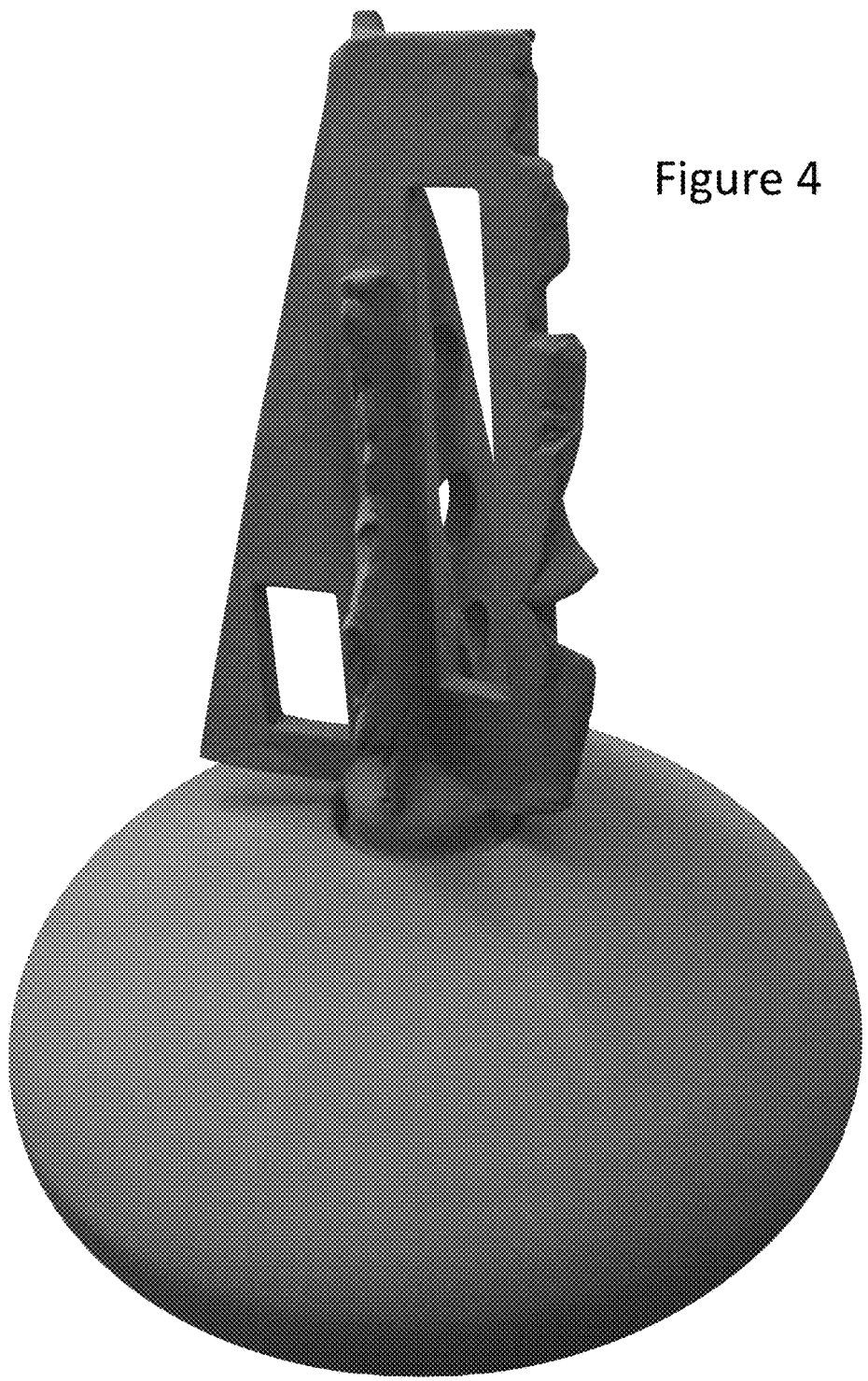
FIG. 4 is a picture of the shaped piece of clay of FIG. 2 after a colored slip has been applied.

For clay that color is to be added to, the piece is then painted with a colored slip having a matte finish in step 114 as depicted in FIG. 4. An example of a suitable type of colored slip is Valerian Velvet Underglaze. However, any colored slip having a matte finish may be utilized in combination with the method of the present invention. The piece, having the matte finish applied, is then bisque baked again at 1560°-2100° F. in step 116. More preferably, the shaped piece of clay is bisque baked at Cone 06 (1830° F.). If no color is to be added to the clay then the colored slip with matte finish need not be applied. The bisque baked piece is then allowed to cool to room temperature in step 120.

Figure 5:
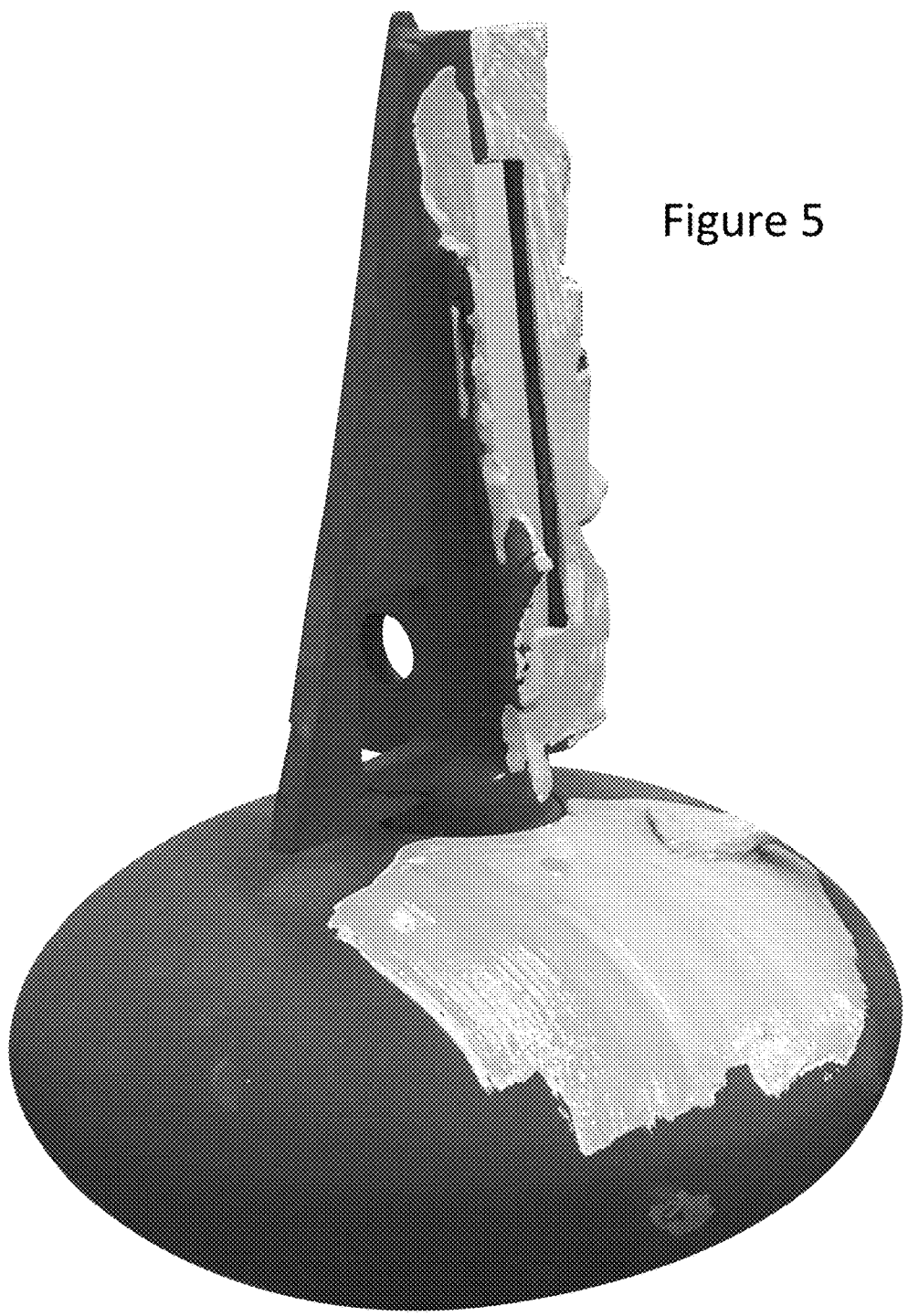
FIG. 5 is a picture of the shaped piece of clay similar to FIG. 3 with liquefied malleable silver being added (painted) to its surface.

At this point, the malleable metal (e.g., PMC3) is converted to liquid form by mixing the PMC3 with water in step 120. Preferably, a malleable metal, such as PMC3 malleable silver, is used. The PMC3 malleable silver can be prepared for application by mixing 2 parts water with 5 parts PMC3 malleable silver before application to the piece. The mixing in step 120 may be done manually or with a machine (i.e. an electric blender). The liquefied malleable metal may then be applied to the surface of the clay by painting or any other desired decorative style in step 122. FIG. 5 depicts application of the liquefied malleable metal to the clay by painting using a brush.

Figure 6:
FIGS. 6 and 7 are pictures of shaped pieces of clay after the malleable silver has been set.

The piece with the applied malleable metal is then baked in the kiln at 1750°-2130° F. in step 124. Preferably, the piece is baked in the kiln at Cone 04 (1940° F.). The finished piece is then allowed to cool inside the kiln with the metal and or beading attaching to become permanently affixed as the piece cools in step 16. The affixed beading, shown in FIG. 6, is the final product with the malleable metal after cooling.

Figure 7:
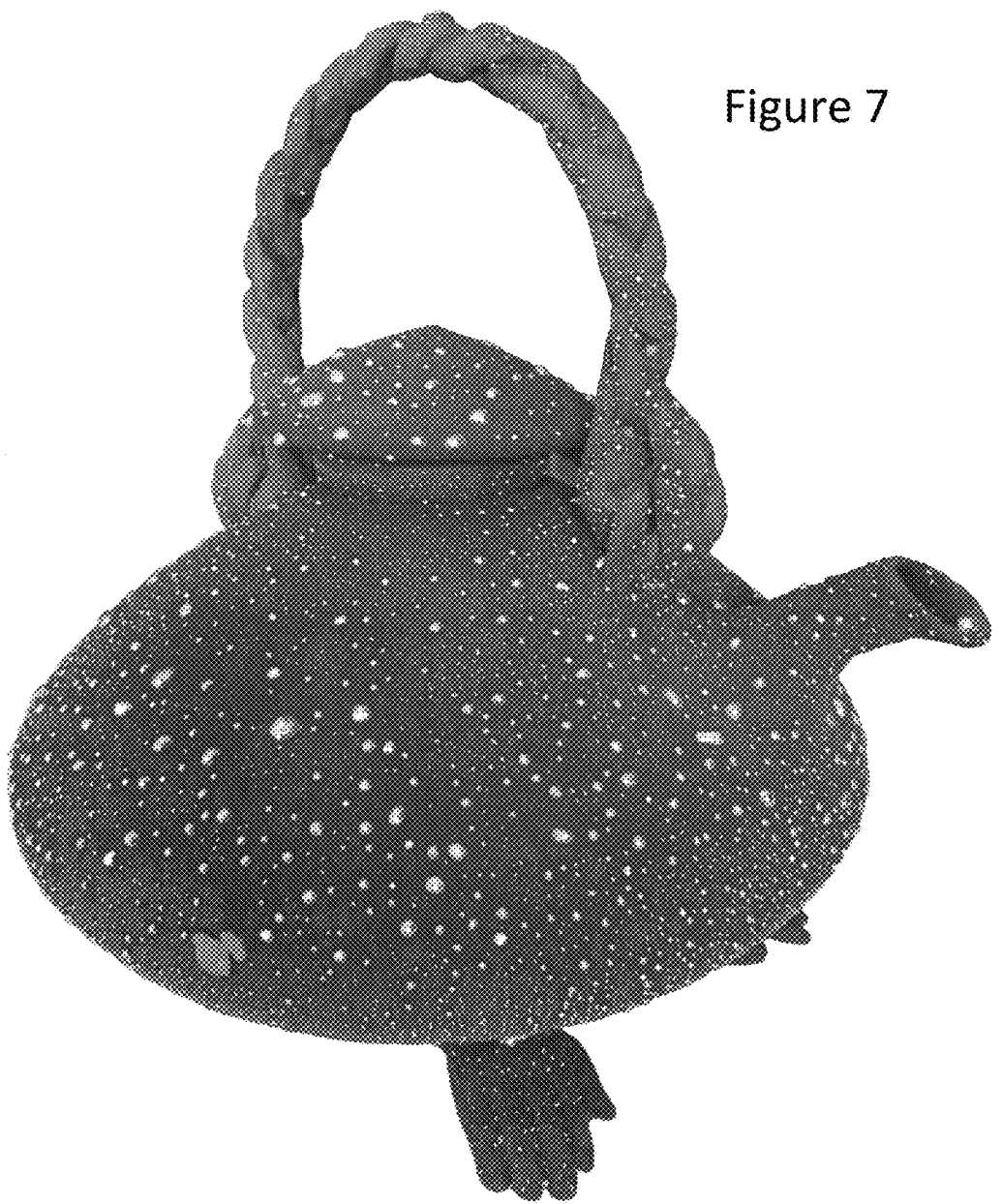

It should be obvious that the temperature range the final baking step would differ for different metals as they may have significantly different properties. For example, gold would require a higher temperature than silver because of its higher melting point. Examples of finished pieces having metal beading attached are depicted in FIGS. 6 and 7.

The invention claimed is:

1. A method for applying metal to clay comprising the ordered steps of:
   a. forming a piece of clay into a desired shape;
   b. drying the piece for 24-96 hours;
   c. baking the piece in a kiln at 1560°-2100° F.;
   d. allowing the piece to cool to room temperature;
   e. applying a colored or clear slip having a matte finish to the piece;
   f. baking the piece in the kiln at 1560°-2100° F.;
   g. allowing the piece to cool to room temperature;
   h. applying a silver precious metal clay in liquid form to the piece using a brush;
   i. baking the piece in the kiln at 1940° F. so that the silver precious metal forms a plurality of beads of silver on a surface of the piece,
   wherein the plurality of beads are each visible to the naked eye and form an irregular pattern on the surface of the piece; and
   j. allowing the piece to cool to room temperature in the kiln.

2. A method for applying metal to clay consisting of the ordered steps of:
   a. forming a piece of clay into a desired shape;
   b. drying the piece for 24-96 hours;
   c. baking the piece in a kiln at 1830° F.;
   d. allowing the piece to cool to room temperature;
   e. applying a colored or clear slip having a matte finish to the piece;
   f. baking the piece in the kiln at 1830° F.;
   g. allowing the piece to cool to room temperature;
   h. applying a silver precious metal clay in liquid form to the piece using a brush;
   i. baking the piece in the kiln at 1940° F. so that the silver precious metal forms a plurality of beads of silver on a surface of the piece;

wherein the plurality of beads are each visible to the naked eye and form an irregular pattern on the surface of the piece; and j. allowing the piece to cool to room temperature in the kiln.

\* \* \* \* \*